United States Patent Office 3,351,590
Patented Nov. 7, 1967

3,351,590
17-AMINOALKYL ETHERS OF 3-KETOESTRENES
Gerhard R. Wendt, Havertown, and Kurt W. Ledig, Philadelphia, Pa., assignors to American Home Products Corporation, New York, N.Y., a corporation of Delaware
No Drawing. Filed Feb. 14, 1964, Ser. No. 344,834
6 Claims. (Cl. 260—239.55)

The present invention relates to new analogs of 19-nortestosterone having in the 17-position an amino alkyl function replacing the hydrogen atom of the hydroxy group conventionally found in position 17 of such compound.

It is a prime object of the invention therefore to disclose novel 17-aminoalkyl ethers of 19-nortestosterone which may be also be referred to as 17-aminoalkyl ethers of 3-ketoestrenes having the formula:

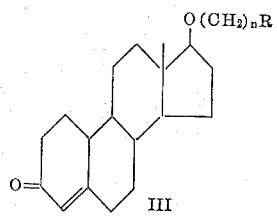

III wherein $n$ is either 2 or 3 and R represents an amino radical such as a lower dialkylamino group or a cyclic amino radical such as morpholino which is preferred, or equivalently piperazino, pyrrolidino, piperidino, substituted piperidino and the like.

The final compounds of our synthesis as represented above are uniquely characterized as being useful hypoglycemic agents. In this regard because of their unique structural arrangement they have been discovered to initiate a relatively new and valuable field of therapy with steroidal materials derived from natural sources.

As a second objective our discovery sets forth certain novel intermediate compounds produced in the course of synthesis of the steroidal hypoglycemics (III) above.

These novel intermediate materials may be represented by the following formulae:

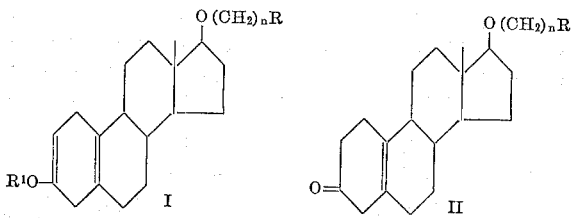

and represent the enol ether, and 5(10) analogs of the compounds represented by structure III above wherein $n$ is as defined.

The value for R remains the same in all structures. The value for R' in structure I may be any lower alkyl group having from 1 to about 7 carbon atoms but is preferably methyl or ethyl.

The invention also has for an additional object the development of a process for the production of said novel 17-aminoalkyl ethers of 3-ketoestrenes.

These and other objects of the invention will become more apparent as the description thereof proceeds.

As regards the process aspects of our invention it should be understood that the final products represented by (III) above may be prepared by more than one mode of synthesis. Our preferred mode of synthesis involves the use of the known starting steroids:

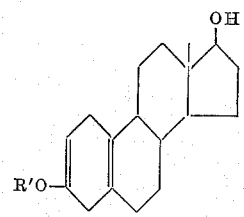

wherein R' represents a lower alkyl group such as methyl or ethyl. This starting material may be subjected to alkylation with such reagents as aminoalkylhalides to yield the first novel enol ether steroidal intermediate to wit:

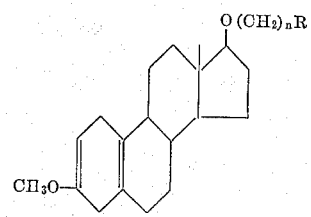

wherein R has the same values as above and after hydrolysis a second novel intermediate:

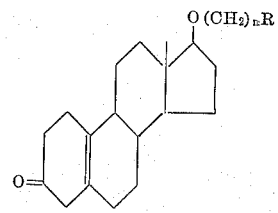

wherein R and $n$ have the above assigned values.

This mode of preparation of our aforesaid compound may be illustrated by the reaction diagram:

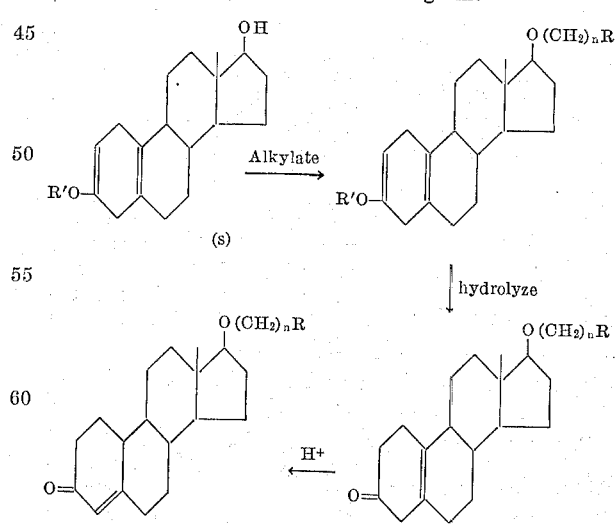

A second manner of synthesis of our final products would involve treatment of a 3,17-substituted 1,3,5(10)-estratrien ether of the structure:

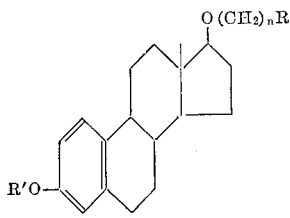

which compound is disclosed in co-pending application of Wendt et al., Ser. No. 320,922 filed Nov. 1, 1963, now U.S. Patent No. 3,180,864. Reduction of the A ring of this compound under conventional Birch conditions will yield the novel intermediate (I) which can be further reacted as above shown to obtain the final products (III). This reaction is as follows:

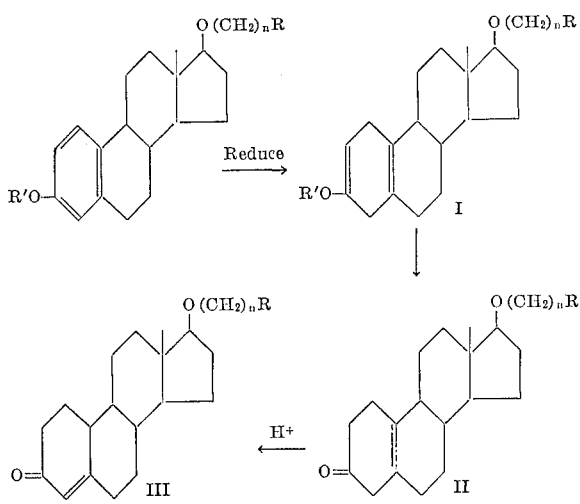

The novel compounds illustrated above can be formulated and administered to mammals for any of the uses noted in a wide variety of oral or parenteral dosage forms singly or in admixture with other active compounds. When contemplated for use in pharmaceutical products they may be admixed and administered in combination with a large number of compatible diluents, carriers, and the like to form a pharmaceutical composition. Such well-known liquid carriers as water, mineral or vegetable oil or a lower non-toxic aliphatic alcohol may be used where injectables are to be prepared. Glycerine or a similar substance may be used where the compound is to be administered as a syrup. Solid excipients, binders, extenders and carriers such as carboxymethylcellulose, starches, sugars and the like may be added where tablets or powders are to be employed as a means of administration. The dosage of the compounds will vary with the severity of the ailment and in general can vary from about 0.05 to 10 mg./kilo of body weight per day depending upon the many factors of the case involved.

It is of course to be understood that the several examples of the preparation of selected members of the series are given purely by way of illustration and are not intended to limit the scope of the invention in any manner. For a legal definition of the scope of the invention disclosed herein attention may be directed only to the several claims appended hereto.

Example I.—d-17β-(2-morpholinoethoxy)-3-methoxyestra-2,5(10)-diene

Reflux a suspension of 5.0 g. of 3-methoxyestra-2,5(10)-diene-17β-ol, 100 ml. of xylene, and 3.9 g. of sodium hydride (50% in oil) for 1.5 hours. After cooling, add 5.5 g. of 1-morpholino-2-chloroethane hydrochloride and reflux the reaction mixture for 5 hours. Filter off the precipitate and evaporate the organic layer to obtain crude d-17β-(2-morpholinoethoxy)-3-methoxyestra-2,5(10)-diene, I.R. no-OH: 5.9: 6.0μ.

Example II.—d-17β-(3-dimethylaminopropoxy)-3-methoxyestra-2,5(10)-diene

Carry out the alkylation as described for Example 1, using 5.5 g. of 1-dimethylamino-3-chloropropane hydrochloride in place of 1-morpholino-2-chloroethane hydrochloride to obtain the product of this example. I.R. of the crude product no-OH: 5.0: 6.0μ.

Example III.—d-17β-(2-morpholinoethoxy)estr-5(10)-en-3-one

Treating the compound d-17β-(2-morpholinoethoxy)-3-methoxyestra-2,5(10)-diene of Example I with a solution of oxalic acid in aqueous methanol, d-17β-(2-morpholinoethoxy)estr-5(10)-en-3-one is obtained as the product of this example.

Example IV.—d-17β-(3-dimethylaminopropoxy)estr-5(10)-en-3-one

Treat d-17β-(3-dimethylaminopropoxy)-3-methoxyestra-2,5(10)-diene in the manner outlined in Example III, to obtain d-17β-(3-dimethylaminopropoxy)estra-5-(10)-en-3-one as the product of this example.

Example V.—d-17β-(2-morpholinoethoxy)estr-4-en-3-one

Treat the crude product of Example I with a solution 160 ml. of methanol, 20 ml. of concentrated hydrochloric acid, and 15 ml. of water for one hour at room temperature. Dilute the reaction mixture with water, extract with benzene followed by ether and make the aqueous layer basic with 10% sodium hydroxide and collect the product with ether. After evaporation of the ether, distill a sample in high vacuum to give d-17β-(2-morpholinoethoxy)estr-4-en-3-one: I.R. 5.91μ MV 242 mμ (ε 15,400): (Found: C, 74.09: H, 9.53; N, 3.39. $C_{24}H_{37}NO_3$ requires C, 74.38; H, 9.62; N, 3.61%).

Example VI.—d-17β-(3-dimethylaminopropoxy)estr-4-en-3-one

Treat the product of Example II as described in the method illustrated in Example V, to give after distillation ($2 \times 10^{-3}$ mm.) of the product of this example at 220° oil bath temperature d-17β-(3-dimethylaminopropoxy) estr-4-en-3-one; IR; 5.81 (appr. 15% 5(10) isomer); 5.92; UV 240 mμ (ε 13,600): (Found: N, 3.92. $C_{23}H_{37}NO_2$ requires N, 3.90%).

Example VII.—d-17β-(2-diethylaminoethoxy)estr-4-en-3-one

When 3-methoxyestra-2,5(10)-dien-17β-ol is alkylated with 1-diethylamino-2-chloroethane hydrochloride following the procedure of Example I and the resulting product is treated as described for Example V, d-17β-(2-diethylaminoethoxy)estr-4-en-3-one is obtained as the product of this example.

We claim:
1. A compound having the formula:

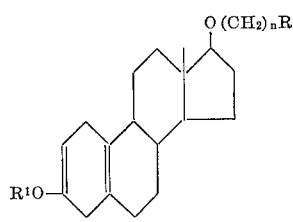

wherein n is an integer selected from 2 and 3 and, wherein R represents an amino radical selected from the group consisting of diloweralkylamino having up to 2 carbon atoms and morpholino and $R_1$ represents a lower alkyl group.

2. d-17β-(2-morpholinoethoxy) - 3 - methoxyestr-2,5(10)-diene.

3. d-17β-(3 - dimethylaminopropoxy)-3-methoxyestra-2,5(10)-diene.

4. A compound having the formula:

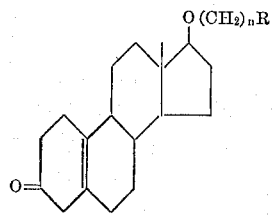

wherein R represents an amino radical selected from the group consisting of diloweralkylamino having up to 2 carbon atoms and morpholino, and $n$ is from 2 to 3.

5. d-17β-(2-morpholinoethoxy)estr-5(10)-en-3-one.

6. d-17β-(3 - dimethylaminopropoxy)estr-5(10)-en-3-one.

References Cited
UNITED STATES PATENTS

| | | | |
|---|---|---|---|
| 3,149,132 | 9/1964 | Julian et al. | 260—239.55 |
| 3,206,457 | 9/1965 | Marshall | 260—239.55 |

LEWIS GOTTS, *Primary Examiner.*

J. R. BROWN, *Assistant Examiner.*